Figure 1:
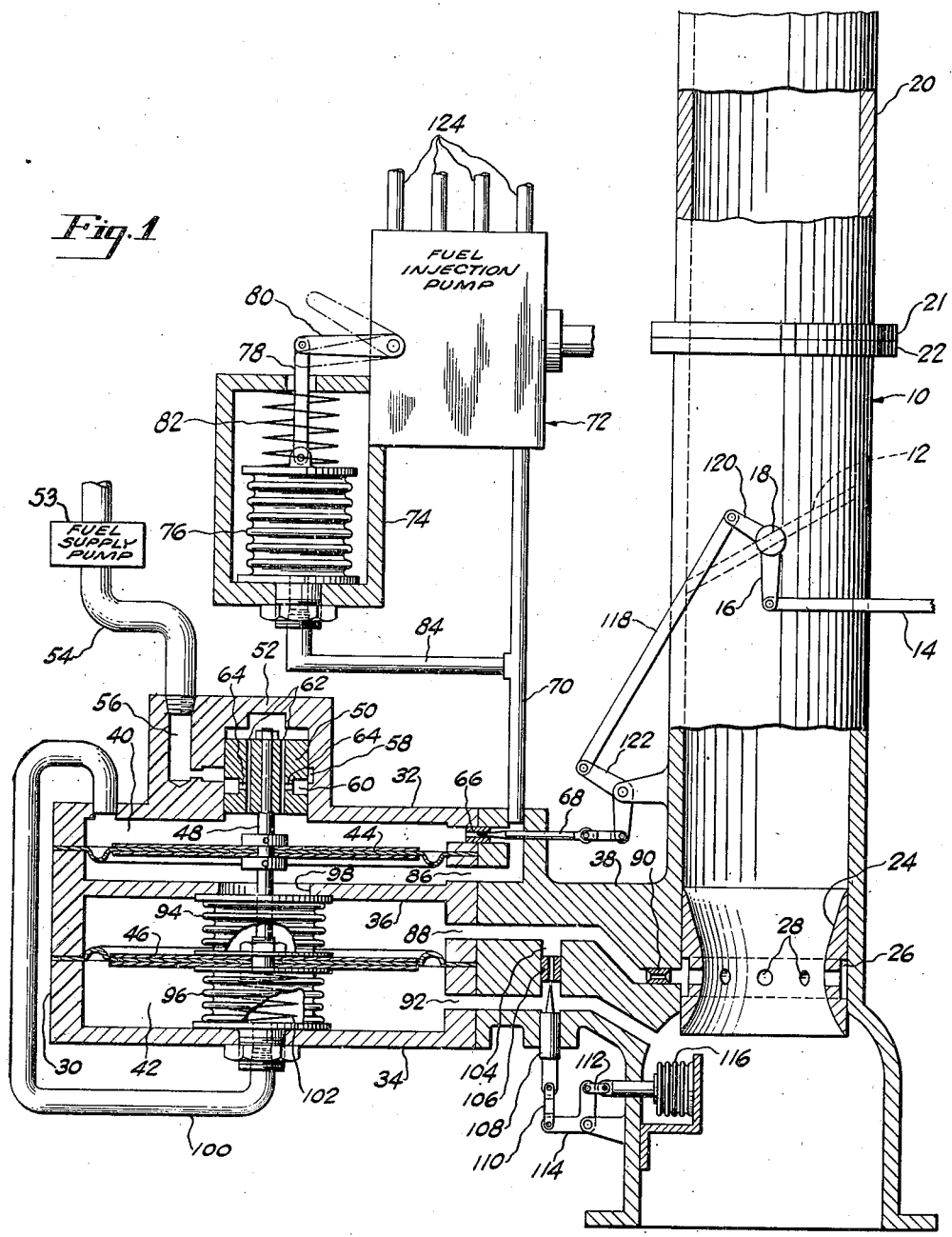

Aug. 17, 1948. G. E. BEARDSLEY, JR 2,447,265
FUEL CONTROL DEVICE
Filed Nov. 3, 1939 2 Sheets-Sheet 1

INVENTOR
Guy E. Beardsley Jr.
BY Harris G. Luther
ATTORNEY

Aug. 17, 1948.  G. E. BEARDSLEY, JR  2,447,265
FUEL CONTROL DEVICE
Filed Nov. 3, 1939  2 Sheets-Sheet 2

INVENTOR
Guy E. Beardsley Jr.
BY
Harris G. Luther
ATTORNEY

Patented Aug. 17, 1948

2,447,265

UNITED STATES PATENT OFFICE 2,447,265

FUEL CONTROL DEVICE

Guy E. Beardsley, Jr., West Hartford, Conn., assignor, by mesne assignments, to Bendix Aviation Corporation, South Bend, Ind., a corporation of Delaware Application November 3, 1939, Serial No. 302,749

33 Claims. (Cl. 123—119)

This invention relates to improvements in fluid ratio controlling devices and has particular reference to an improved control for the fuel air ratio of an internal combustion engine.

An object of the invention resides in an improved control apparatus operative to automatically proportion the amount of fuel supplied to the engine to the amount of engine intake air.

A further object of the invention is to automatically proportion the total amount of fuel distributed by an engine fuel distributor to the total amount by weight of air taken in by the engine.

A further object resides in the provision of an improved manually controllable engine intake air and fuel supply means in which the fuel supply means is automatically operative to accurately proportion the amount of fuel supplied to the engine to the mass flow of engine intake air, that is, the mass or weight rate of flow per unit of time, supplies under said manual control under normal power operation and to supply sufficient fuel to said engine to maintain engine operation when said manual control is in its engine idling position.

A still further object resides in an improved control apparatus for an engine of the fuel injection type in which the air supply to the engine is manually controlled and the quantity of fuel distributed to the engine by a fuel injection pump or similar distributor is automatically controlled in accordance with the weight rate of air being supplied to the engine.

Still another object resides in an improved fuel control apparatus for an engine of the fuel injection type in which the injection pump for distributing separate and distinct fuel charges to the engine utilizes a fluid pressure variably controlled in accordance with the ratio of the weights of air and fuel supplied to the engine for actuating the element controlling the quantity of fuel delivered to the engine by the injection pump.

Other objects and advantages will be more particularly pointed out hereinafter or will become apparent as the description proceeds.

In the accompanying drawings there are illustrated, by way of example, two slightly different mechanical arrangements for the purpose of disclosing the invention. The drawings, however, are for the purpose of illustration only and are not to be taken as limiting or restricting the scope of the invention as it will be apparent to those skilled in the art that various changes may be made in the illustrated arrangements without in any way exceeding the scope of the invention.

Figure 2:
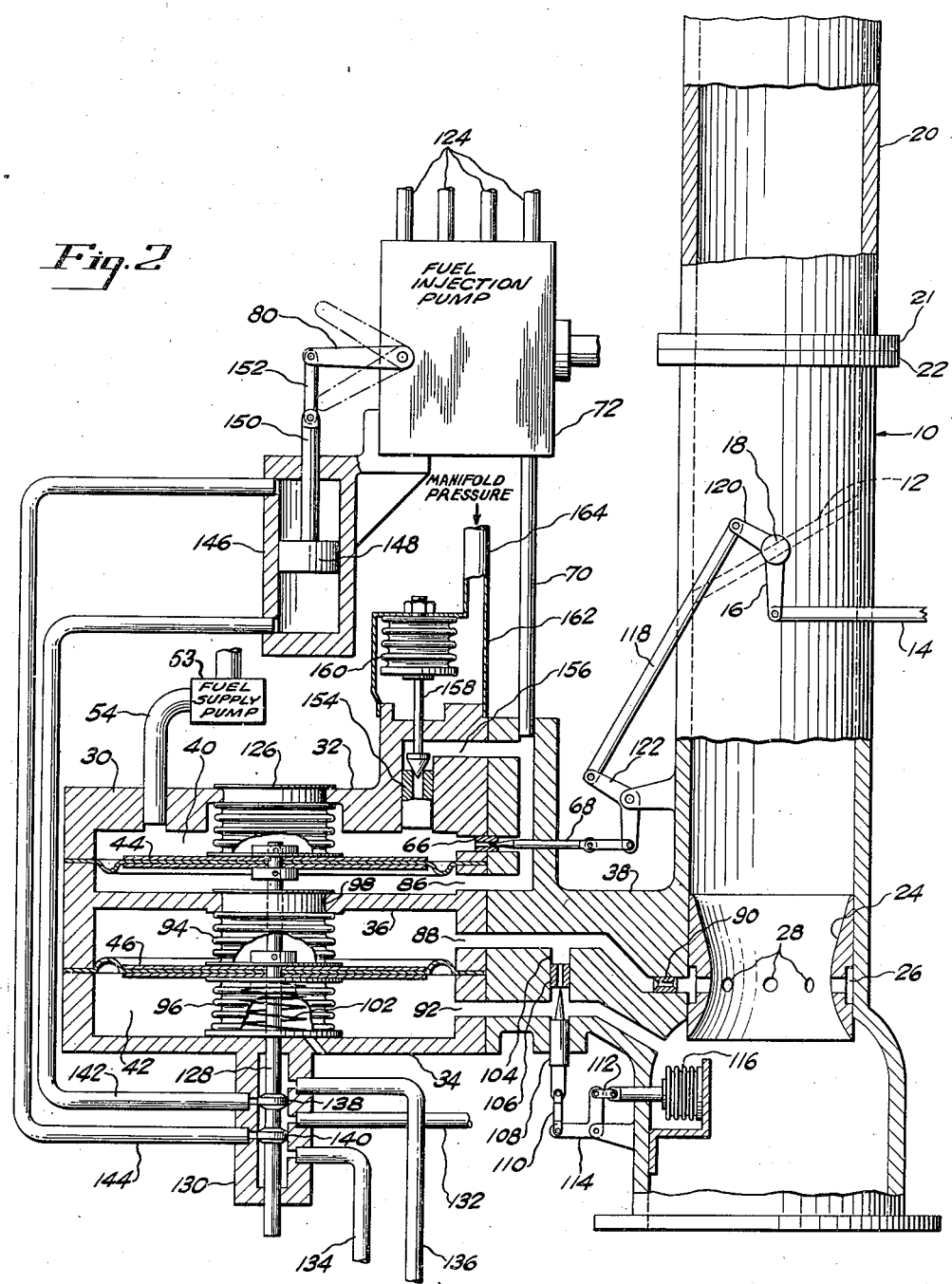

In the drawings, Fig. 1 is a diagrammatic illustration of an engine intake air conduit provided with a manual control and one form of engine fuel supply control for proportioning the amount of fuel supplied to the engine to the mass flow of intake air through said intake conduit, certain parts of the device being shown in section to better illustrate the construction thereof, and Fig. 2 is a view similar to Fig. 1 showing a somewhat modified form of engine fuel control.

Referring to the drawings in detail, and particularly to Fig. 1, the numeral 10 generaly indicates an engine intake air conduit open at one end to the atmosphere or connected at that end to a supercharger, not illustrated, and provided intermediate its length with a manually controllable throttle, which may be in the form of a butterfly valve 12, manually operable by the movable link 14 connected by means of the lever arm 16 with the valve shaft 18. At its end past the throttle 12 in the direction of airflow this conduit may be connected with an engine supercharger intake, or intake manifold, 20 by some suitable means, such as the overlapping flanges 21 and 22.

Near its intake end the conduit 10 is provided with a restriction in the form of a Venturi tube 24. The tube 24 is provided with an annular chanel 26 in the portion of the exterior of the tube which fits into the intake conduit 10 and this channel is connected by means of the radial ports 28 with the interior of the venturi at or near the point of greatest restriction.

A hollow casing 30, which may be of cylindrical form, having closed ends 32 and 34 and a transverse partition 36 is connected to and supported upon the intake end of the intake conduit 10 by suitable means such as the bracket 38, illustrated as formed integrally with the open end of the intake conduit. The interior of the casing 30 is divided by the partition 36 into two separate chambers 40 and 42 and the upper chamber is divided transversely by a movable diaphragm 44 while the lower chamber is similarly divided by a movable diaphragm 46. Both of the diaphragms, 44 and 46, are centrally connected to a movable stem 48 which passes through the partition 36 and extends at its upper end through a slide valve plunger 50 reciprocable in a closed cylinder 52 formed or secured upon the upper surface of the casing end 32 in substantially concentric relation therewith.

The main fuel supply is led under pressure from a fuel supply pump 53 through a conduit 54 and passage 56 to an annular channel 58 provided in the inner wall of the cylinder 52. The reciprocable valve plunger 50 is provided with an annular groove 60 adapted to register with the groove or channel 58 when the plunger is in a predetermined position. The plunger 50 is provided with a plurality of apertures or channels 62 which extend from the space between the plunger and the closed upper end of the cylinder 52 to the space between the end 32 of the casing 30 and the upper diaphragm 44 and these channels are connected with the groove 60 by suitable transverse ports 64. From this description it will be apparent that whenever the plunger 50 is in position so that the groove 60 registers in whole or in part with the channel 58 fuel will flow from the conduit 54 and passage 56 into the portion of the chamber 40 above the diaphragm 44 and that the plunger 50 will always have equal pressures acting on its opposite ends because of the provision of the through channels 62.

The fuel flows from the portion of the chamber 40 above the diaphragm 44 through an orifice or restriction 66 controlled by a needle valve 68 to the conduit 70 which leads to the intake of a fuel distributing device such as a fuel injection pump, generally indicated at 72. The device 72 has not been illustrated in detail but, for the purpose of disclosing the invention, is shown as representing any one of various forms of conventional plunger-type fuel injection pumps commonly employed to inject separate and distinct charges of fuel directly into the cylinders of internal combustion engines, through conduits such as 124, in timed relation with the engine. The application of the invention, however, is not limited to any particular form of pump as the control may be applied to other forms of fuel distributing devices.

In the illustrated constructions a casing 74 is secured to, or in position relative to, the pump 72 and contains an expansible chamber element which may be in the form of a sealed bellows 76 rigidly connected at one end to the casing 74 and connected at its movable end through a pivoted link 78 with the control arm 80 of the pump 72. The control arm 80 may operate to vary the amount of fuel distributed by the pump or distributor 72 in any suitable manner such as by changing the effective stroke of its piston-type plungers in a manner well known to the art. Movement of the bellows 76 in an expanding direction to increase the stroke of the pump may be resiliently resisted by a suitable compression spring 82. The interior of the bellows 76 is connected through the branch conduit 84 with the conduit 70 leading from the fuel chamber 40 to the intake of the pump 72 so that the pump is controlled in accordance with the pressure of the fuel in the conduit 70. The pressure of the fuel in the conduit 70 is controlled in accordance with the mass airflow through the intake conduit 10 by the mechanism contained in the casing 34 and associated therewith in a manner which will presently appear.

The end of the fuel conduit 70 which connects with the casing 34 is connected by means of a substantially unobstructed passage 86 with the space in the chamber 40 below the diaphragm 44.

The valve 68, cooperating with the orifice 66, is an idling control valve and remains open during power operation of the engine so that the chamber 40 is connected with the fuel conduit 70 through the orifice and the passage 86. With a flow of fuel through the line 70 a pressure differential will be created in the chamber 40 upon the opposite sides of the diaphragm 44, the pressure above the diaphragm being somewhat higher than the pressure below the diaphragm because of the obstruction of the orifice 66 in the passage leading from the space above the diaphragm. This pressure differential tends to move the diaphragm 44 downwardly to close the valve 50.

The chamber 42 containing the diaphragm 46 is connected with the interior of the air intake 10 through two passages 88 and 92 disposed one upon each side of the diaphragm. The portion of the space 42 above the diaphragm 46 is connected by the passage 88 with the annular groove 26 surrounding the throat of the venturi 24 while the portion of the space 42 below the diaphragm 46 is connected by the passage 92 with the space in the intake duct 10 ahead of the venturi 24 in the direction of air flow. Since the air pressure at the throat of the venturi is less than the pressure of the air in the relatively unrestricted portion of the intake duct on the upstream side of the venturi when air is flowing through the venturi 24 and intake duct 10, a pressure differential will be created upon opposite sides of the diaphragm 46 since the pressure in the channel 88 connected with the Venturi throat will be less than the pressure in the channel 92 connected with the unrestricted portion of the intake duct on the upstream side of the venturi. This pressure differential will tend to move the diaphragm 46 upwardly in a direction to open the valve 50.

It will thus be seen that two opposing forces exist both of which act on the stem 48, one tending to move the stem to close the fuel valve 50 in response to a pressure differential on the diaphragm 44 created by and varying as a function of the flow of fuel through the orifice 66, and the other tending to open the fuel valve 50 in response to a pressure differential on the diaphragm 46 created by and varying as a function of the flow of air through the venturi 24. Since the fuel flow is controlled by the location of the fuel valve 50 these two opposing forces will balance each other at a certain relationship of fuel flow to airflow. The physical laws governing the flow of liquid and the flow of gasses through fixed restrictions indicate that this relationship will remain substantially constant over a wide range of rates of flow.

Since an aperture 98 has to be provided in the partition 36 for the passage therethrough of the stem 48 it is necessary to provide some means to separate the space 40 from the space 42 while still permitting free movement of the stem 48. Such means may conveniently take the form of a flexible seal member 94 sealed at one end to the partition 36 surrounding the aperture 98 and sealed at its opposite end to the upper surface of the diaphragm 46. The unbalancing force on the diaphragm 46 caused by the area of the interior of this seal member, connected with the portion of the space 40 below the diaphragm 44, may be counterbalanced by a similar seal member 96 sealed at one end to the undersurface of the diaphragm 46 and sealed at its opposite end to the bottom wall 34 of the chamber 30 and having its interior connected through the conduit 100 with the space in the chamber 40 above the diaphragm 44, the internal area of the seal 96 being the same as the internal area of the seal 94.

With this arrangement there is an area of the diaphragm 44 subjected to an upward force and an equal area of the diaphragm 46 within the seal 94 subjected to an equal downward force which two forces exactly cancel each other since the two diaphragms are rigidly connected together by the stem 48. Similarly there is a downward force on an area of the upper surface of the diaphragm 44 which is exactly cancelled by an upward force on the lower surface of an equal area of the diaphragm 46 within the flexible seal 96. Thus areas of both diaphragms 44 and 46 equivalent to the areas of the flexible seals 94 and 96 are mutually balanced so that the effect of fluid pressure on these areas does not effect the valve controlling operation of the diaphragms. In other words, by the arrangement shown, the seals merely reduce the effective areas of diaphragms 44 and 46, the pressures in each of the spaces above and below diaphragms 44 and 46 being effective over a net diaphragm area equal to the area of the diaphragm minus the area of the seal.

Since the regulation of the fuel flow is accomplished entirely by differential pressures it follows that the absolute values of the fuel pressure in the line 70 does not affect the metering of the fuel by valve 50. On the other hand, the pressure of the fuel in line 70 will be transmitted through line 84 to the interior of the bellows 76 wherein the pressure of the fluid tends to expand the bellows against the force of the spring 82. Any movements of the free end of the bellows occasioned by changes in the pressure of the fuel within the bellows is transmitted through the link 78 to the pump regulating arm 80.

With the engine operating in equilibrium with the fuel and air being properly proportioned the air differential pressure on diaphragm 46 will be balanced by the fuel differential on diaphragm 44. If now the air flow to the engine should increase, as by opening of throttle 12, the air differential pressure across diaphragm 46 will increase thereby urging stem 48 upwardly to further open valve 50. As more fuel is then being passed through valve 50 into the conduit 70 than is being withdrawn from the conduit 70 by the pump 72, there will be a pressure rise in the conduit 70 and a consequent expansion of the bellows 76 producing an increase in the stroke of the pumps. This increasing of the pump stroke will continue until the pumps are taking away as much fuel from the conduit 70 as is necessary to create a pressure drop across orifice 66 and diaphragm 44 which will balance the air pressure differential across diaphragm 46, whereupon the fuel to air ratio supplied the engine will be re-established or maintained at its desired value and the stem 48 and its diaphragm assembly will again be in equilibrium. Similarly, if the flow of fuel through the metering valve 50 falls below the capacity of the pumps at a particular stroke setting, as will occur upon closing of the throttle 12 and resulting closing movement of valve 50, the pressure in conduit 70 will decrease and a readjustment of the pump stroke will be accomplished to reduce the pump capacity such that the flow through the metering valve and metering orifice will be just sufficient to re-establish equilibrium of the fuel and air differential pressures acting on diaphragms 44 and 46. Substantially constant fuel to air proportioning is thus obtained.

When the engine speed is very low, as when the engine is operating in the idling range, an enriched mixture is desired. In addition, during idling the mass flow of air through the air intake very slight pressure differential in the chamber 42 on the opposite sides of the diaphragm 46, which pressure difference, while theoretically effective to continue the control of the metering valve 50, is practically undependable because of frictional effects and other factors of resistance in the mechanism. Therefore, in order to insure a steady and sufficient supply of fuel in the low speed range a suitable resilient member, such as the coil spring 102, is disposed below the diaphragm 46 to resiliently urge the valve 50 to partially open position. This spring may conveniently be disposed in the lower seal member 96 as illustrated and exerts a force which is in addition to and in the same direction as the force created on stem 48 by the air differential pressure on diaphragm 46. An increased fuel flow is thus provided such that the force created on stem 48 by the fuel differential pressure on diaphragm 44 is sufficient to balance both the air force and the spring force. The mixture richness is thus increased at idle as is desired.

The spring force is, however, comparatively slight since the force exerted by the fuel differential tending to close the valve is very low in the engine idling range as the engine consumes but a small amount of fuel when idling. Since, however, the force exerted by the fuel flow pressure differential on the diaphragm 44 when the engine is operating in its power range is comparatively large, the ratio of the fuel flow pressure differential force to the spring force becomes so large in the power range that the spring force may be neglected and the resultant of the fuel differential force and air pressure differential force relied upon to control the fuel metering operation of the fuel valve 50.

It has been found desirable to select an idle spring 102 of a strength sufficient to provide an excessive enrichment at idle and then to decrease the enrichment by using a throttle controlled valve arranged to restrict the effective area of the metering orifice 66 as the throttle approaches idling position thereby making available any desired idle and near idle enrichment. This is accomplished by the valve 68 which is operatively connected with the throttle valve shaft 18 by means of the link 118 and levers 120 and 122. The valve 68 and its operating elements are so constructed and arranged that the valve does not begin to restrict the orifice 66 until a low engine speed throttle setting is reached at which the effect of the spring 102 becomes important in controlling the operation of the valve 50. At all smaller throttle openings and hence all lower engine speeds the fuel is metered to the engine by the valve 68 operating in conjunction with the orifice 66 and the metering valve 50 and the air and fuel flow at these low speeds is controlled primarily by the position of the throttle 12 and the valve 68 rather than by the effect of mass airflow through the venturi 24 on the diaphragm 46. This method operates effectively for the low speed throttle settings indicated since at each such throttle setting the mass flow of intake air through the engine remains substantially constant and a constant fuel supply is, therefore, required. Although changes in the engine load such as are occasioned by changing in the pitch of the engine driven propeller or changes in the flying attitude of an engine carrying airplane may cause the engine speed to vary within relatively wide limits, the mass airflow to the engine remains speeds because of the well known physical law of gas flow to the effect that, when gas is flowing through a conduit having a restriction therein, further decreases in the pressure of the gas in the conduit beyond the restriction in the direction of flow from a value approximately one-half the pressure in the conduit ahead of the restriction do not increase the rate of flow through the conduit. Thus, since with throttle settings in the engine idling range, the pressure ahead of the throttle is normally more than twice the pressure beyond the throttle, the airflow will remain substantially constant for any particular throttle setting regardless of variations in engine speed.

It is a circumstance well known to the art that the density of atmospheric air decreases with increases in altitudes, and that the reduction in pressure at the throat of a venturi for any given mass airflow therethrough varies in inverse proportion to the square root of the air density. This indicates that the same mass airflow through the venturi will not produce the same pressure drop at the Venturi throat if the altitude varies with a consequent variation in atmospheric air density and that it is necessary, therefore, to incorporate an altitude compensating device in any apparatus designed to function in accordance with mass airflow if the apparatus is to function correctly at different altitudes.

The following description is illustrative of one manner in which the necessary altitude compensation can be accomplished.

A restriction or orifice 90 is disposed in the channel 88 and a channel 104 is provided interconnecting the channels 88 and 92 and having a restriction or orifice 106 therein. The opening through the orifice 106 is controlled by a needle valve 108 operated through a suitable leverage, including the links 110 and 112 and the bellcrank 114, by an expansible element 116 disposed in the air intake conduit adjacent to the intake end of the venturi 24 and responsive to changes in the density of the air surrounding it. When the density of the air in the intake ahead of the venturi is at normal sea level temperature and pressure, the expansible element 116 is contracted until the needle valve 108 closes the aperture 106, in which case the restrictions 106 and 90 are inoperative and the diaphragm 46 is subject directly to the pressure difference between the air pressure ahead of the venturi and the pressure at the Venturi throat. If the air in the intake ahead of the venturi is at a density less than that of the air at sea level the element 116 will expand and move the valve 108 to open the orifice 106 an amount proportional to the variation of the air density from the density at sea level. With the orifice 106 thus partially open, air will flow through this orifice into the channel 88, to the orifice 90, the annular space 26, and out the openings 28 due to the pressure differential existing along this path. Because of this flow the portion of the channel 88 between the restrictions 106 and 90 will then have a pressure different from either the pressure in the channel 92 or the pressure at the Venturi throat but proportional to both. By properly contouring the needle 108 and selecting the correct sizes for the orifices 106 and 90 it can be so arranged that the pressure differential on opposite sides of the diaphragm 46 is maintained constant for the same mass airflow regardless of the density of the air in the air intake ahead of the venturi, since the space in the chamber 42 above the diaphragm 46 is connected to the portion of the channel 88 between the restrictions 106 and 90.

In the modified arrangement illustrated in Fig. 2 the conduit 54 from the fuel pump leads directly into the portion of the chamber 40 above the diaphragm 44 without passing through any metering valve. However, since the fuel may flow through the passage 86 to the underside of the diaphragm 44 the pressure differential acting on this diaphragm will be that created by flow of fuel through the orifice 68 to the conduit 70 leading to the intake of the pump 72. In this construction the area of the diaphragm 46 included in the flexible seal 94 is balanced by an equal area on the undersurface of the diaphragm 44, the interior of the flexible seal 96 is connected with the atmosphere and a similar seal 126 also interiorally connected with the atmosphere is provided between the upper surface of the diaphragm 44 and the end 32 of the casing 30, thus balancing the seal area on the lower surface of the diaphragm 46 with a similar area on the upper surface of the diaphragm 44. A pressure differential proportional to airflow through the venturi 24 is obtained in the manner described above and the altitude compensator including the valve 108, orifice 106 and expansible element 116 operate in the manner already described.

The stem 128 connecting the diaphragms 44 and 46 projects downwardly through the casing end 34 into a cylindrical valve casing 130 to one side of which are connected a fluid pressure line 132 and two drain lines 134 and 136. These fluid lines are connected by suitable ports with the cylindrical valve chamber in the casing 130 and the stem 128 is provided within the casing with a pair of spaced pistons, 138 and 140, for controlling these ports and similar ports on the opposite side of the valve aperture leading to conduits 142 and 144 which connect with the opposite ends of a cylinder 146 secured in position relative to the pump 72. A piston 148 is reciprocable in the cylinder 146 and connected through its rod 150 and a suitable link 152 with the control lever 80 of the pump 72.

During power operation of the engine the resultant of the fuel pressure differential acting on the diaphragm 44 and the air pressure differential acting on the diaphragm 46 will control the position of the valve member 128 and regulate the pump 72 through the intermediary of the hydraulic motor including the cylinder 146 and piston 148 to supply the correct amount of fuel to the engine in proportion to the mass airflow through the engine air intake 10. In the engine idling range the spring 102 acts against the force of the fuel pressure exerted on the diaphragm 44 to control the valve member 128 in a manner to maintain the stroke of the pump 72 sufficient to supply the necessary amount of fuel to the engine. As the pump stroke increases the decrease in pressure in the portion of the chamber 40 below the diaphragm 44 will create a force acting against the spring and tend to move the valve member to a position to decrease the pump stroke. Thus the pump will be controlled by the force of the spring 102 and the fuel will be metered to the pump by the valve 68 in the manner described above.

The idling mixture control including the valve 68, lever 122, link 118 and arm 120, operate in the manner described above but this form of the invention has been shown as including an additional economizer device in the form of a valve comprising a seat 154 disposed in a passage 156 leading from the space in the chamber 40 above the diaphragm 44 to the intake end of the conduit 70 to connect the fuel line 54 with the pump intake, and a valve 158 operated by an expansible element 160 for controlling the passage 156. The expansible element 160 is mounted in a fluid tight casing 162 which is connected with the engine intake manifold or supercharger, not illustrated, by the conduit 164 so that, if the manifold pressure increases beyond a predetermined value, the increase in pressure in casing 162 will contract the element 160 to remove the valve 158 from the seat 154 and permit additional fuel to flow through the passage 156 and conduit 70 to the intake of the pump 72 to richen the air fuel mixture when the engine is operating near the upper end of its power range. The reason more fuel is fed is because when the valve 158 is lifted from its seat 154 it in effect increases the total area of the orifices between the area above the diaphragm 44 and the area below the diaphragm. This will of course cause movement of the valve 128 and the plunger 148 to increase the discharge volume of the pump 72. When the pressures above and below the diaphragm 44 are again restored to their former value, necessary to balance the system and place the valve 128 in a neutral position, a greater volume of fuel will be fed because of the larger orifice opening with the same pressure difference.

While two somewhat different constructional forms have been illustrated in the accompanying drawings and hereinabove described for the purpose of disclosing the invention, it is to be understood that the invention is not limited to the particular arrangement so illustrated and described, but that such changes in the size, shape and arrangement of the various parts may be resorted to as come within the scope of the subjoined claims. A portion of the subject matter disclosed but not claimed herein is being claimed in my copending divisional application Serial No. 567,265, filed December 8, 1944, and in the copending application of Frank C. Mock, Serial No. 362,572, filed October 24, 1940, a continuation of abandoned application Serial No. 118,718, filed January 2, 1937.

Having now described the invention so that others skilled in the art may clearly understand the same, what it is desired to secure by Letters Patent is as follows:

1. In a direct injection fuel system for an internal combustion engine having an air intake, a fuel injection pump adapted to be connected with respective engine cylinders for directly injecting liquid fuel into said cylinders, mechanism associated with said pump for varying the quantity of fuel delivered by said pump to said cylinders, said mechanism including a movable element actuated by variations in a fluid pressure, and control means operatively associated with said movable element to vary the rate of flow by weight of fuel delivered to said cylinders by said pump solely as a function of the rate of flow by weight of air passing to said engine through said air intake, said control means including, a fuel diaphragm movable in response to variations in the rate of flow by weight of fuel passing to said pump, an air diaphragm responsive to variations in the rate of flow by weight of air passing to said air intake, a main fuel orifice for metering the flow of fuel through said injection pump, and at least one auxiliary fuel orifice for supplementing the action of said main fuel orifice at a predetermined engine operating condition.

2. In a direct injection fuel system for an internal combustion engine having an air intake, an injection pump having a plurality of outlets for introducing a measured amount of fuel into respective engine cylinders, a conduit connected to said pump, a pair of interconnected diaphragms responsive respectively to the rate of fuel flow through said conduit and the rate of air flow through said air intake, said diaphragms being movable to deflected positions on either side of a neutral position in response to variations in the rate of said air flow or the rate of said fuel flow, and means controlled by said diaphragms effective when said diaphragms are deflected on one side of said neutral position to continuously increase the capacity of said pump independently of diaphragm movement and effective when said diaphragms are deflected on the other side of said neutral position to continuously decrease the capacity of said pump independently of diaphragm movement.

3. In a direct injection fuel system for an engine having a combustion chamber and an air intake, a fuel injection pump for directly injecing liquid fuel into said combustion chamber, mechanism associated with said pump for varying the quantity of fuel delivered by said pump to said combustion chamber, said mechanism including a hydraulically actuated piston, and control means hydraulically connected with said piston for maintaining the rate of flow by weight of fuel delivered to said combustion chamber by said pump in predetermined ratio to the rate of flow by weight of air passing to said combustion chamber through said air intake, said control means including, a fuel diaphragm responsive to variations in the rate of flow by weight of fuel flowing to said combustion chamber through said pump, an air diaphragm responsive to variations in the rate of flow by weight of air flowing to said combustion chamber through said air intake, a main fuel orifice for metering the flow of fuel through said pump, at least one auxiliary fuel orifice for supplementing the action of said main fuel orifice, and fluid pressure responsive means for controlling the flow of fuel through said auxiliary orifice in accordance with variations in a predetermined engine operating condition.

4. In a direct injection charging system for an engine having a combustion chamber and an air intake, an injection pump for delivering a measured amount of a liquid charge into said combustion chamber, a liquid inlet conduit connected to said pump, a pair of diaphragms responsive to the rate of liquid flow through said conduit and the rate of air flow through said air intake, a valve having a first open position a closed position and a second open position, a piston movable to vary the amount of liquid delivered by said pump to said combustion chamber, means controlled by said valve for continuously moving said piston to increase the amount of liquid delivered by said pump when said valve is in said first open position and for continuously moving said piston to decrease the amount of liquid delivered by said pump when said valve is in said second open position, and means for placing said valve in said first or second open positions or in said closed position solely in accordance with the position of said diaphragms and independently of movements of said piston.

5. In a fuel mixture control for an internal combustion engine, a variable delivery direct fuel injection pump adapted to be driven in timed relation to the engine, a conduit supplying fuel to the injection pump, a calibrated metering orifice in the conduit, an air passage, a venturi in said air passage for creating an air differential pressure, means including a capsule responsive to variations in the density of the air in said air passage for producing a modified air differential pressure, means for controlling the delivery from the fuel injection pump, means for controlling the air flow through the air passage, manual means for operating one of said controlling means and means responsive to said modified air differential pressure and to the fuel pressures anterior and posterior to said orifice for operating the other of said controlling means.

6. A method of supplying two fluids, namely fuel and air, to a multi-cylinder internal combustion engine comprising supplying air to the cylinders of the engine, forcefully injecting separate and distinct charges of fuel into the individual cylinders of the engine intermittently in timed relation with the engine, utilizing a variable fluid pressure for variably controlling the rate of flow of one of said fluids to the engine, utilizing pressures varying as a function of the rates of fuel and air flow to the engine for selecting the value of said variable pressure controlling the rate of flow of said one fluid, and manually controlling the rate of flow of the other of the fluids to the engine.

7. In a fuel feeding system for an internal combustion engine, a fuel conduit, a fuel pump adapted to receive fuel from said conduit and deliver it to the engine, a metering restriction in said conduit, means for varying the effective area of said restriction, a main air supply conduit, manually actuated means controlling the flow through one of said conduits, a power actuated device for controlling the flow through the other of said conduits, and means responsive to opposed forces varying as a function of the weight of air flowing through the main air conduit and of the weight of fuel flowing through the metering restriction for controlling the power actuated device.

8. In a fuel injection system for an internal combustion engine, a fuel injection pump for intermittently supplying individual charges of fuel to a combustion chamber of the engine in timed relation with the engine, a fuel conduit for supplying fuel to said pump, a main air supply conduit for supplying air to the combustion chamber of the engine, manually actuated means for varying the flow through one of said conduits, fluid pressure actuated means for varying the flow through the other of said conduits, and valve means conjointly responsive to pressures varying in accordance with variations in the flow through said conduits for varying the fluid pressure on said fluid pressure actuated means.

9. A fuel and air supply system for an engine comprising a main air supply passage, a throttle therein, a venturi in said passage for creating an air differential pressure, means jointly responsive to variations in the pressure and temperature of the air in the passage for modifying said air differential pressure, a variable delivery fuel injection pump for intermittently injecting charges of fuel into the engine in timed relation therewith, and means responsive to said modified air differential pressure for varying the fuel pump delivery.

10. A system for supplying fuel and air to an engine comprising a main air supply passage having a throttle, a venturi in said air passage anterior to the throttle for creating an air differential pressure, a fuel injection pump for intermittently injecting separate and distinct charges of fuel into the respective combustion chambers of the engine in timed relation therewith and having a control for varying the quantity of fuel in said charges, a conduit for supplying fuel to the pump, area restricting means in said conduit for creating a fuel differential pressure, and means responsive to said air and fuel differential pressures for actuating said pump control.

11. The invention defined in claim 10 comprising in addition means for varying the effective area of said area restricting means.

12. In a fuel control for an internal combustion engine having an air passage, a fuel conduit, a fuel injection pump for receiving fuel from the conduit and delivering it to the engine, a servo-motor actuated means for controlling the effective stroke of the pump to thereby control the flow through the fuel conduit, and means responsive to the resultant of opposed forces created by air and fuel pressures varying in accordance with the flow through said air passage and fuel conduit for controlling the servo-motor.

13. In a fuel feeding system for an internal combustion engine, an air passage, a venturi therein, a manually operable throttle in the passage, a fuel conduit, a fuel injection pump for delivering separate and distinct fuel charges to the engine, a servo-motor having a control member and an actuated member, means for varying the fuel delivery from said pump connected to said actuated member, and means responsive to air pressures respectively derived from the entrance to and the throat of said venturi and to fuel pressures at spaced points in the fuel conduit for controlling the servo-motor control member.

14. The invention defined in claim 13 comprising in addition means responsive to variations in the temperature and pressure of the air in the air passage for modifying said air pressures.

15. In a system for supplying fuel and air to an engine, a main air supply conduit, a venturi therein, a fuel injection pump, a fuel conduit for supplying fuel to said pump, a meternig element in said fuel conduit, a servo-motor having a control member and an actuated member, means for varying the fuel delivery from the pump connected to said actuated member, a plurality of diaphragms operatively connected to each other and to the control member, two oppositely disposed sides of said diaphragms being respectively connected to the fuel conduit on opposite sides of the metering element, and connections from the other two sides of said diaphragms to the air conduit and venturi respectively.

16. For use in a fuel system for a multi-cylinder engine; a fuel injection pump having a plurality of pumping elements for supplying individual charges of liquid fuel to the combustion chambers of the engine in timed relation with the engine, a fuel conduit for supplying fuel to the pump, a pump control element for varying the quantity of fuel in said individual charges, an air passage for supplying air to the cylinders, a control element in the air passage for varying the quantity of air supplied to the cylinders, means for creating forces respectively variable in response to variations in the flow through the air passage and fuel conduit, coacting pressure responsive elements movable in response to said forces, and fluid pressure means controlled by said pressure responsive elements for actuating one of said control elements.

17. In a fuel injection system for an engine, a fuel injection pump, a fuel conduit leading from the pump to a cylinder of the engine for supplying individual charges of liquid fuel thereto in timed relation with the engine, a fuel control element for varying the quantity of fuel in the individual charges, a fuel passage for supplying fuel to the pump, an air passage for supplying air to the cylinder, a control element for varying the quantity of air supplied to the cylinder, pressure fluid means actuating one of said control elements and means responsive to air and fuel pressures varying in accordance with variations in the flow of fuel and air to the engine for controlling said pressure fluid means.

18. In a fuel system for a multi-cylinder engine, a fuel injection pump for supplying individual charges of liquid fuel to the engine in timed relation therewith, a pump control element for varying the quantity of fuel in said individual charges, a fuel conduit supplying fuel to the pump, an air passage for supplying air to the cylinders, a control element in the air passage for varying the quantity of air supplied to the cylinders, differential pressure creating means in the fuel conduit, differential pressure creating means in the air passage, and pressure fluid means responsive to said differential pressures for controlling one of said control elements.

19. The invention defined in claim 18 comprising in addition means responsive to variations in air supply pressure for modifying the control effected by the differential pressure responsive means.

20. In a fuel system for a multi-cylinder engine, a fuel conduit, a fuel injection pump for supplying individual charges of liquid fuel to the engine in timed relation therewith, a control for varying the quantity of fuel in said individual charges, an air passage supplying air to the engine, a manually operable throttle in the passage, area restricting means in the fuel conduit for creating a fuel differential pressure, means in the air passage anterior to the throttle for creating an air differential pressure, a plurality of coupled spaced diaphragms, two oppositely disposed faces of the diaphragms being subjected to the air differential pressure and the other two faces being subjected to the fuel differential pressure, said differential pressures tending to move the diaphragms in opposite directions, a spring operative to oppose the force of the fuel differential pressure on the diaphragms particularly during idling, a throttle controlled element for decreasing the effective area of the area restricting means as the throttle approaches its idling position, a fluid pressure actuated member for operating the control, and valve means connected to the diaphragms for varying the supply of fluid to the fluid pressure actuated member.

21. In a fuel system for an engine, a fuel conduit, a fuel injection pump adapted to receive fuel from the conduit and to supply it to the engine, means including a fluid pressure operated member movable in opposite directions for respectively increasing and decreasing the effective stroke of the pump to control the quantity of fuel supplied the engine and being arranged to increase the quantity in response to an increase in fluid pressure, an air passage supplying air to the engine, differential pressure creating means in the air passage and in the fuel conduit, and means including a plurality of diaphragms responsive to the differential pressures in the air passage and fuel conduit for varying the pressure on the fluid pressure operated member to thereby vary the quantity of fuel supplied to the engine.

22. In combination with an internal combustion engine of the multi-cylinder type, a fuel injection pump, fuel pipes connecting the pump to the engine for supplying individual charges of liquid fuel thereto in timed relation with the engine, a pump control element for varying the quantity of fuel in said individual charges, a fuel conduit for supplying fuel to the pump, an air passage for supplying air to the engine cylinders, a throttle in the air passage, differential pressure creating means in the fuel conduit, differential pressure creating means in the air passage, and means for actuating the pump control element including a fluid actuated member connected to the said element and a plurality of diaphragms responsive to the differential pressures in the air passage and fuel conduit.

23. In a fuel system for an internal combustion engine of the multi-cylinder type, an air duct for supplying air to the cylinders, a control element in the duct for varying the air supply, a fuel conduit, a fuel injection pump adapted to receive fuel from the conduit, fuel pipes connecting the injection pump to the engine for supplying individual charges of liquid fuel to the engine cylinders in timed relation with the engine, a control element for varying the quantity of fuel in the individual charges, area restricting means in the fuel conduit for creating a fuel differential pressure, means in the air duct for creating a differential pressure, manual means for controlling one of the control elements, and automatic means for controlling the other of said control elements, said automatic means comprising four chambers each having a movable wall, pressure transmitting passages connecting the differential pressure creating means in the air duct to two of said chambers, means for subjecting the other two chambers to the fuel differential pressure, and fluid pressure means operatively interconnecting said movable walls and said last named control element.

24. The invention defined in claim 23 comprising in addition a calibrated passage interconnecting the pressure transmitting passages, a sealed chamber having a wall movable in response to variations in the pressure of the air supplied to the engine, and a valve connected to said wall for controlling at least one of the passages.

25. In combination with an internal combustion engine of the multi-cylinder type, a fuel source, a fuel pump connected thereto, a fuel injection pump for supplying individal charges of liquid fuel to the engine in timed relation therewith, a fuel conduit interconnecting the fuel pump and injection pump, a fuel metering element in the conduit for creating a fuel differential pressure, an air passage for supplying air to the engine, a main air metering element in the air passage for creating an air differential pressure, a control element for varying the quantity of fuel in the individual charges, a control element for varying the air supply to the engine, manually operable means for controlling one of said control elements, fluid pressure means for controlling the other of said control elements, and means responsive to the air and fuel differential pressures for controlling said fluid pressure means.

26. In combination with a multi-cylinder internal combustion engine of the direct fuel injection type provided with a throttle-controlled air-induction passage having means associated therewith for creating a differential pressure varying in relation to the rate of air flow, a fuel supply system comprising an injection pump timed with the engine and having a control element movable to vary the rate of delivery of the pump, fluid pressure means for actuating said control element, a conduit for delivering fuel under pressure to the pump having a restriction therein creating a differential pressure varying in relation to the rate of fuel flow, a regulator unit including coacting diaphragms one of which is subjected to the air-differential pressure and another of which is subjected to the fuel-differential pressure, said diaphragms being arranged in opposition but interconnected for movement in unison so that any variation in air flow will result in a proportionate variation in fuel flow, means operatively connecting said diaphragms to said fluid pressure means, said pump control element thus being always positioned to deliver fuel charges in proportion to the rate of mass air flow as determined by the position of the throttle, and means responsive to changes in air density for automatically modifying the air-differential pressure.

27. In a fuel system for an internal combustion engine of the multi-cylinder type, an air passage for supplying air to the cylinders, a control element in the passage for varying the air supply, a fuel conduit, a fuel injection pump receiving fuel from the conduit, fuel pipes connecting the injection pump to the engine for supplying individual charges of liquid fuel to the engine in timed relation with the engine, a control element for varying the quantity of fuel in the individual charges, area-restricting means in the fuel conduit for creating a fuel differential pressure, means in the air passage for creating an air differential pressure, manual means for controlling one of the control elements, and automatic means for controlling the other of said control elements, said automatic means comprising four chambers each having a movable wall, pressure transmitting passages connecting the differential-pressure-creating means in the air passage to two of said chambers, means for subjecting the other two chambers to the fuel differential pressure, and means responsive to a pressure varying with variations in engine operating conditions for varying the effective area of the area-restricting means.

28. In a fuel system for an internal combustion engine of the multi-cylinder type, an air passage for supplying air to the cylinders, a control element in the passage for varying the air supply, a fuel conduit, a fuel injection pump receiving fuel from the conduit, fuel pipes connecting the injection pump to the engine for supplying individual charges of liquid fuel to the engine cylinders in timed relation with the engine, a control element for varying the quantity of fuel in the individual charges, area-restricting means in the fuel conduit for creating a fuel differential pressure, means in the air passage for creating an air differential pressure, manual means for controlling one of the control elements, and automatic means for controlling the other of said control elements, said automatic means comprising four chambers each having a movable wall, pressure-transmitting passages connecting the differential-pressure-creating means in the air passage to two of said chambers, means for subjecting the other two chambers to the fuel differential pressure, manually operable means for varying the effective area of the area-restricting means and automatic pressure-responsive means for varying the effective area of the area-restricting means.

29. In a direct fuel injection system for a multi-cylinder internal combustion engine having a throttle-controlled air-induction passage, a venturi in the air passage anterior the throttle for creating an air differential pressure varying in response to variations in the rate of air flow, a fuel injection pump timed with the engine and having a plurality of pumping elements for supplying individual charges of liquid fuel to the combustion chambers of the engine, a pump control element movable to vary the quantity of fuel in each charge, a conduit for delivering fuel under pressure to the pump having a restriction therein for creating a differential pressure varying in response to variations in the rate of fuel flow, an automatic regulator including a pair of spaced air and fuel diaphragms arranged in opposition and interconnected for movement in unison, a passage for conducting a measure of air-impact pressure from said air induction passage to one side of the air diaphragm and another passage for communicating a measure of venturi suction to the opposite side of said latter diaphragm, fuel differential pressure passages respectively communicating said fuel-delivery conduit anterior and posterior to said restriction with the opposite sides of said fuel diaphragm, and fluid-pressure means operatively interconnecting said diaphragms with said pump control element, any variation in air flow to the engine producing a proportionate variation in the effective differential across the air diaphragm which acts through said fluid pressure means and pump control element to increase or decrease the effective rate of fuel delivery until a balanced condition is attained between the air differential pressure and the fuel differential pressure.

30. The invention defined in claim 29 comprising in addition a bleed communicating the impact pressure and venturi suction passages and means responsive to changes in air density controlling the effectiveness of said bleed.

31. In a fuel injector control mechanism, an air conduit, controlling means responsive to variations in the quantity of air flowing through said conduit, hydraulic control mechanism controlled by said controlling means, fuel injector mechanism including an injector pump having an element for varying the delivery of said pump, means controlled by said hydraulic control mechanism for adjusting said element to vary the delivery of said pump as a function of air flow, a throttle for controlling the air flow through said conduit, and means becoming effective at low air flows as when the throttle is in a closed or substantially closed position during idling for automatically varying the delivery of said pump.

32. In a fuel injector control mechanism, an air conduit, a throttle for controlling the flow of air through said conduit, controlling means responsive to variations in the quantity of air flowing through said conduit, hydraulic regulating means controlled by said controlling means including a fluid actuated member, fuel injector mechanism including an injector pump having an element for varying the delivery of said pump, means operatively connecting said member to said element, and mechanical means becoming effective at low air flows as when the throttle is moved to an idling position for automatically modifying the action of said member to vary the delivery of said pump during idling.

33. A method of proportioning the flow of two fluids, namely fuel and air, to an engine, comprising the supplying of air to the cylinder of the engine, utilizing the flow of air to create a differential pressure varying with the rate of air supply to the engine, modifying said differential pressure in response to variation in air density, forcefully injecting separate and distinct charges of fuel into the engine cylinder in timed relation therewith, utilizing the flow of fuel to create a fuel differential pressure varying in accordance with the rate of fuel flow to the engine, utilizing said modified air differential pressure and said fuel differential pressure for controlling the rate of flow of one of said fluids to the engine, and manually controlling the rate of flow of the other of said fluids to the engine.

GUY E. BEARDSLEY, JR.

REFERENCES CITED

The following references are of record in the file of this patent:

UNITED STATES PATENTS

| Number | Name | Date |
|---|---|---|
| 1,363,513 | Keith | Sept. 28, 1920 |
| 1,894,510 | Ensign | Jan. 17, 1933 |
| 1,955,037 | Viel | Apr. 17, 1934 |
| 2,004,869 | Hogg | June 11, 1935 |
| 2,025,091 | Chandler | Dec. 24, 1935 |
| 2,010,420 | Simmen | Aug. 6, 1935 |
| 2,091,163 | Schweizer | Aug. 24, 1937 |
| 2,103,126 | Sugihara | Dec. 21, 1937 |
| 2,125,886 | Chandler | Aug. 9, 1938 |
| 2,129,613 | Wunsch et al. | Sept. 6, 1938 |
| 2,139,981 | Sugihara | Dec. 13, 1938 |
| 2,150,075 | Mennesson | Mar. 7, 1939 |
| 2,161,743 | Heinrich et al. | June 6, 1939 |
| 2,165,447 | Browne | July 11, 1939 |
| 2,177,120 | Schaeren | Oct. 24, 1939 |
| 2,189,475 | Saur | Feb. 6, 1940 |
| 2,223,381 | Mock | Dec. 3, 1940 |
| 2,233,035 | Schweizer et al. | Feb. 25, 1941 |
| 2,240,515 | Partington | May 6, 1941 |
| 2,261,856 | Neugebauer et al. | Nov. 11, 1941 |
| 2,264,347 | Udale | Dec. 2, 1941 |
| 2,269,294 | Udale | Jan. 6, 1942 |
| 2,281,411 | Campbell | Apr. 8, 1942 |
| 2,297,213 | Gosslau et al. | Sept. 29, 1942 |

FOREIGN PATENTS

| Number | Country | Date |
|---|---|---|
| 392,345 | England | May 18, 1933 |
| 429,081 | England | May 23, 1935 |
| 458,350 | England | Dec. 17, 1936 |
| 367,310 | Italy | Jan. 20, 1939 |

Certificate of Correction

Patent No. 2,447,265.  August 17, 1948.

GUY E. BEARDSLEY, Jr.

It is hereby certified that errors appear in the printed specification of the above numbered patent requiring correction as follows:

Column 1, line 20, for the word "supplies" read *supplied*; column 2, line 28, for "chanel" read *channel*; column 12, line 48, for "meternig" read *metering*;

and that the said Letters Patent should be read with these corrections therein that the same may conform to the record of the case in the Patent Office.

Signed and sealed this 25th day of January, A. D. 1949.

[SEAL]

THOMAS F. MURPHY,
*Assistant Commissioner of Patents.*